US008761960B2

(12) United States Patent
Kanamori et al.

(10) Patent No.: US 8,761,960 B2
(45) Date of Patent: Jun. 24, 2014

(54) YAW RATE DETECTION APPARATUS

(75) Inventors: Ryohei Kanamori, Utsunomiya (JP); Mahito Ishiyama, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/699,857

(22) PCT Filed: Jun. 1, 2011

(86) PCT No.: PCT/JP2011/062593
§ 371 (c)(1),
(2), (4) Date: Nov. 26, 2012

(87) PCT Pub. No.: WO2011/152453
PCT Pub. Date: Dec. 8, 2011

(65) Prior Publication Data
US 2013/0073118 A1 Mar. 21, 2013

(30) Foreign Application Priority Data

Jun. 1, 2010 (JP) ................................. 2010-125947

(51) Int. Cl.
*G05D 1/00* (2006.01)
(52) U.S. Cl.
USPC .......................................................... 701/1
(58) Field of Classification Search
USPC .......................................................... 701/1
See application file for complete search history.

(56) References Cited

U.S. PATENT DOCUMENTS

| 5,719,790 A | 2/1998 | Lohrenz et al. | |
|---|---|---|---|
| 2004/0079145 A1* | 4/2004 | Kin et al. | 73/146 |
| 2005/0080517 A1 | 4/2005 | Hiemer et al. | |

FOREIGN PATENT DOCUMENTS

| DE | 195 02 858 C1 | 7/1996 |
|---|---|---|
| EP | 0 809 167 A1 | 11/1997 |
| JP | 04-278870 A | 10/1992 |
| JP | 4-346024 A | 12/1992 |
| JP | 7-172333 A | 7/1995 |
| JP | 11-094874 A | 4/1999 |
| JP | 2000-275270 A | 10/2000 |
| JP | 2000-346869 A | 12/2000 |
| JP | 2004-148903 A | 5/2004 |
| WO | 03/043862 A1 | 5/2003 |

OTHER PUBLICATIONS

Extended European Search Report issued in EP Patent Application 11789855.1 and dated Jan. 3, 2014.
Japanese Office Action issued in JP Patent Application 2012-518429, mailing date of Feb. 4, 2014, with English translation thereof.

* cited by examiner

*Primary Examiner* — James Trammell
*Assistant Examiner* — Michael D Lang
(74) *Attorney, Agent, or Firm* — Carrier Blackman & Associates, P.C.; Joseph P. Carrier; Jeffrey T. Gedeon

(57) ABSTRACT

A yaw rate detection apparatus includes: a vehicle yaw rate detection device detecting a yaw rate of a vehicle to output a detection value thereof; a right-wheel and left-wheel speed detection device detecting at least speeds of right and left wheels to output detection values thereof; a wheel speed yaw rate calculation device calculating a wheel speed yaw rate from the detection values of the speeds of the right and left wheels; a turning correction coefficient calculation device calculating a turning correction coefficient based on an amount of turning associated with a turning operation within a predetermined time in which the detection value of the vehicle yaw rate deviates due to a temperature change; and a vehicle yaw rate correction device correcting the detection value of the vehicle yaw rate based on the detection value of the vehicle yaw rate, the wheel speed yaw rate and the turning correction coefficient.

11 Claims, 3 Drawing Sheets

YAW RATE DETECTION APPARATUS

TECHNICAL FIELD OF THE INVENTION

The present invention relates to a yaw rate detection apparatus.

Priority is claimed on Japanese Patent Application No. 2010-125947, filed Jun. 1, 2010, the content of which is incorporated herein by reference.

BACKGROUND ART

Conventionally, it is known that an offset value is generated in an output value of a vehicle yaw rate sensor, for example, due to a temperature change or the like. It is known that apparatus for correcting the offset value during vehicle traveling calculates the difference between the speeds of right and left wheels based on a diameter ratio between right and left wheels, calculate a wheel speed yaw rate from the difference between the speeds of the right and left wheels, and calibrate an output value of a vehicle yaw rate sensor using the wheel speed yaw rate (see, for example, Patent Document 1).

PRIOR ART DOCUMENTS

Patent Documents

Patent Document 1: Japanese Unexamined Patent Application, First Publication No. H11-94874

SUMMARY OF THE INVENTION

Problems to be Solved by the Invention

Incidentally, in the apparatus according to the above-mentioned related art, execution of the calculation of the diameter ratio between the right and left wheels is limited to within a predetermined time at a start of traveling and during a straight traveling. However, such driving conditions are not necessarily satisfied during traveling. For this reason, there is a concern that there might be no chance to calibrate the vehicle yaw rate sensor after the start of traveling.

The invention is contrived in view of such circumstances, and an object thereof is to provide a yaw rate detection apparatus which is capable of properly calibrating a detection value of a vehicle yaw rate regardless of the vehicle traveling state.

Means for Solving the Problems

In order to solve the above-mentioned problem, each aspect of the invention adopts the following measures.

[1] A yaw rate detection apparatus according to a first aspect of the invention includes: a vehicle yaw rate detection device which detects a yaw rate of a vehicle to output a detection value thereof; a right-wheel and left-wheel speed detection device which detects at least speeds of right and left wheels to output detection values thereof; a wheel speed yaw rate calculation device which calculates a wheel speed yaw rate from the detection values of the speeds of the right and left wheels; a turning correction coefficient calculation device which calculates a turning correction coefficient based on an amount of turning associated with a turning operation within a predetermined time in which the detection value of the vehicle yaw rate deviates due to a temperature change; and a vehicle yaw rate correction device which corrects the detection value of the vehicle yaw rate based on the detection value of the vehicle yaw rate, the wheel speed yaw rate and the turning correction coefficient.

[2] In the yaw rate detection apparatus according to the above [1], the turning correction coefficient calculation device may calculate the turning correction coefficient so that an absolute value of the turning correction coefficient increases as the amount of turning increases.

[3] In the yaw rate detection apparatus according to the above [1], the wheel speed yaw rate detection device may calculate the wheel speed yaw rate with respect to a front wheel and a rear wheel, and the yaw rate detection apparatus may further include an alarming device which issues an alarm to a driver when a difference between the wheel speed yaw rate of the front wheel and the wheel speed yaw rate of the rear wheel is equal to or more than a predetermined value.

[4] In the yaw rate detection apparatus according to the above [1], the vehicle yaw rate correction devices may include a device which calculates a time average value which is an average value of an integrated value of a deviation between the detection value of the vehicle yaw rate and the turning correction coefficient; a device which corrects the time average value by using the turning correction coefficient to calculate a time average correction value; and a device which corrects the detection value of the vehicle yaw rate by using the time average correction value.

[5] In the yaw rate detection apparatus according to the above [4], the device which corrects the detection value of the vehicle yaw rate by using the time average correction value may correct the vehicle yaw rate by using an average value of a time average correction value of the front wheel and a time average correction value of the rear wheel.

Effect of the Invention

According to the yaw rate detection apparatus of the above-mentioned aspect of [1], the wheel speed yaw rate calculated from the right and left wheel speeds and the turning correction coefficient are used in addition to the detection value of the vehicle yaw rate, thereby the detection value of the vehicle yaw rate can be corrected even during the turning traveling of the vehicle without being limited to the straight traveling thereof.

Further, it is possible to detect the vehicle yaw rate by detecting the speeds of the right and left wheels, and at the same time, it is possible to calculate the diameter ratio of the left wheel to the right wheel, that is, the air pressure difference therebetween. The air pressure difference between the left wheel and the right wheel is used for correcting the detection value of the vehicle yaw rate, thereby the correction accuracy of the vehicle yaw rate can be improved.

In addition, according to the yaw rate detection apparatus of the above-mentioned [2], as the amount of turning increases, the absolute value of the turning correction coefficient changes so as to increase, thereby the correction accuracy of the detection value of the vehicle yaw rate during the turning traveling can be improved.

In addition, according to the yaw rate detection apparatus of the above-mentioned [3], the wheel speed yaw rates of the right and left front wheels and the right and left rear wheels are calculated, and thus the diameter ratio of the right and left front wheels to the right and left rear wheels, that is, the air pressure difference therebetween is calculated simultaneously with the wheel speed yaw rate. For this reason, when the difference between the wheel speed yaw rate of the right and left front wheels and the wheel speed yaw rate of the right and left rear wheels is equal to or more than a predetermined value, it can be determined that the air pressure difference between the right and left front wheels and the right and left rear wheels is abnormal. For this reason, it can be determined that one of the wheels is causing an abnormality such as a drop in air pressure, and the abnormality can be properly reported to a driver.

In addition, according to the yaw rate detection apparatus of the above-mentioned [4], the time average value is corrected using the turning correction coefficient to calculate a time average correction value, and the detection value of the vehicle yaw rate is corrected by using the time average correction value, thereby the correction accuracy of the vehicle yaw rate can be improved.

In addition, according to the yaw rate detection apparatus of the above-mentioned [5], the vehicle yaw rate is corrected by using an average value of a time average correction value of the front wheel and a time average correction value of the rear wheel, thereby the correction accuracy of the detection value of the vehicle yaw rate during the turning traveling can be improved.

DESCRIPTION OF EMBODIMENT

Hereinafter, an embodiment of a yaw rate detection apparatus according to the invention will be described with reference to the accompanying drawings.

Figure 1:
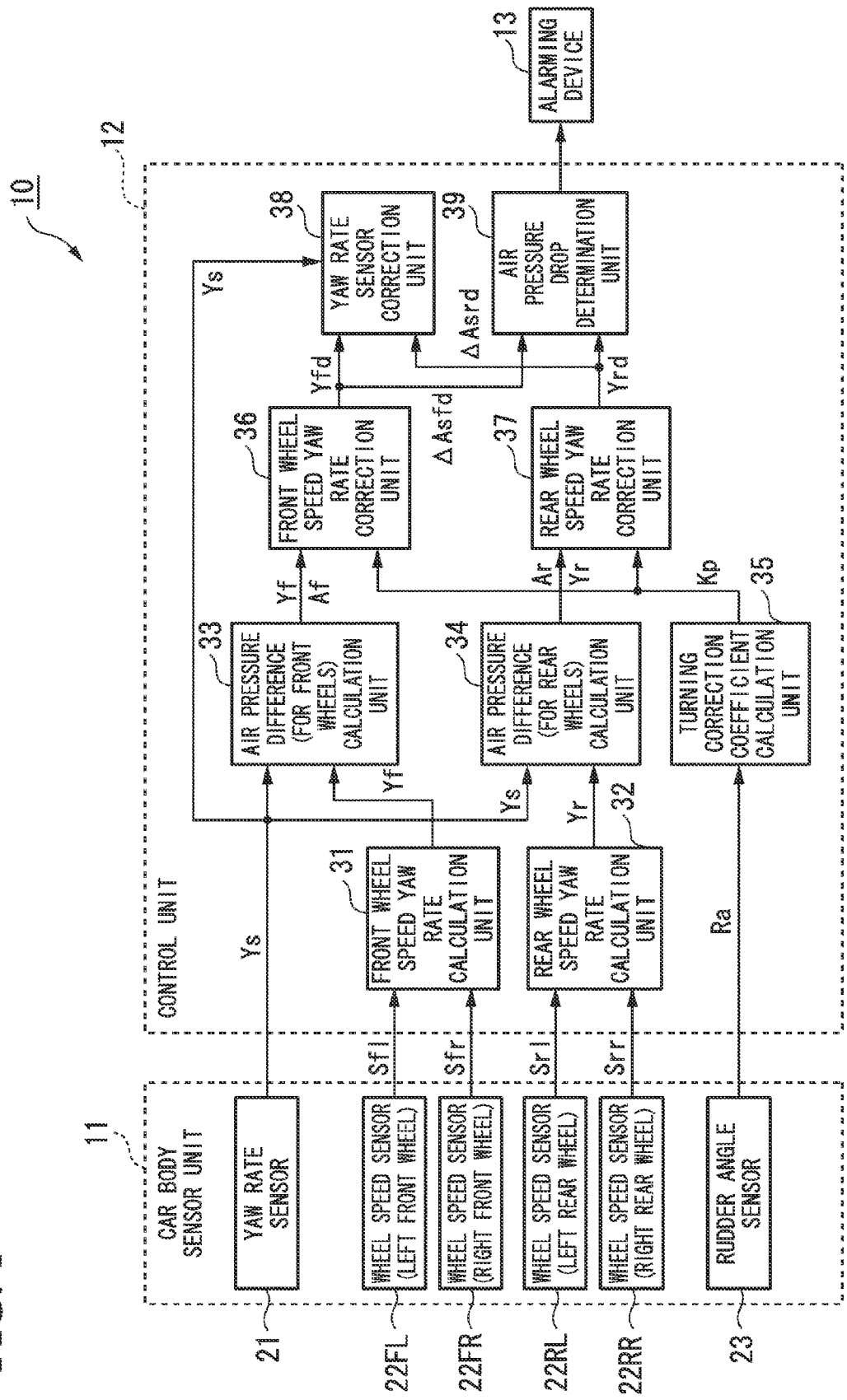
FIG. 1 is a configuration diagram illustrating a yaw rate detection apparatus according to an embodiment of the invention.

A yaw rate detection apparatus 10 according to the embodiment is mounted on a vehicle, for example, as shown in FIG. 1, and includes a car body sensor unit 11, a control unit 12, and an alarming device 13.

The car body sensor unit 11 includes, for example, a vehicle yaw rate sensor 21, wheel speed sensors 22FL, 22FR, 22RL, and 22RR of four wheels, and a rudder angle sensor 23.

The vehicle yaw rate sensor 21 detects a yaw rate of a vehicle (rotational angular velocity around the vertical axis of the center of gravity of a vehicle), and outputs a signal of a detection value.

Each of the wheel speed sensors 22FL, 22FR, 22RL, and 22RR sequentially detects the speeds of a left front wheel, a right front wheel, a left rear wheel, and a right rear wheel, and outputs detection values of respective wheel speeds Sfl, Sfr, Srl, and Srr.

The rudder angle sensor 23 detects a rudder angle (steering angle) of a steering wheel operated by a driver or an actual rudder angle (driving rudder angle) based on the steering angle, and outputs a rudder angle detection value ra.

The control unit 12 includes, for example, a front wheel speed yaw rate calculation unit 31, a rear wheel speed yaw rate calculation unit 32, an air pressure difference (for the front wheels) calculation unit 33, an air pressure difference (for the rear wheels) calculation unit 34, a turning correction coefficient calculation unit 35, a front wheel speed yaw rate correction unit 36, a rear wheel speed yaw rate correction unit 37, a vehicle yaw rate sensor correction unit 38, and an air pressure drop determination unit 39.

The front wheel speed yaw rate calculation unit 31 calculates a front wheel speed yaw rate Yf with reference to a predetermined wheel speed yaw rate map or the like stored in advance, based on the detection value Sfl of the left front wheel speed and the detection value Sfr of the right front wheel speed which are output from each of the wheel speed sensors 22FL and 22FR of the front wheels, and outputs a calculated value thereof.

The rear wheel speed yaw rate calculation unit 32 calculates a rear wheel speed yaw rate Yr with reference to the predetermined wheel speed yaw rate map or the like stored in advance, based on the detection value Srl of the left rear wheel speed and the detection value Srr of the right rear wheel speed which are output from each of the wheel speed sensors 22RL and 22RR of the rear wheels, and outputs a calculated value thereof.

Meanwhile, the predetermined wheel speed yaw rate map is, for example, a map showing a predetermined correspondence relationship between the difference between the right and left wheel speeds (that is, the speed difference between the left front wheel and the right front wheel, or the speed difference between the left rear wheel and the right rear wheel), and the yaw rate, that is, the respective wheel speed yaw rates Yf and Yr.

The air pressure difference (for the front wheels) calculation unit 33 calculates a temporal average value (time average value $\Delta$Asf), for example, from the difference between the front wheel speed yaw rate Yf and a vehicle yaw rate (detection value) Ys, based on the calculated value of the front wheel speed yaw rate Yf which is output from the front wheel speed yaw rate calculation unit 31 and the vehicle yaw rate (detection value) Ys which is output from the vehicle yaw rate sensor 21. Next, a predetermined air pressure difference map is retrieved using the time average value $\Delta$Asf or the like, and the air pressure difference Af between the left front wheel and the right front wheel is calculated.

The air pressure difference (for the rear wheels) calculation unit 34 calculates a temporal average value (time average value $\Delta$Asr), for example, from the difference between the rear wheel speed yaw rate Yr and the vehicle yaw rate (detection value) Ys, based on the calculated value of the rear wheel speed yaw rate Yr which is output from the rear wheel speed yaw rate calculation unit 32 and the vehicle yaw rate (detection value) Ys which is output from the vehicle yaw rate sensor 21. Next, the predetermined air pressure difference map is retrieved using the time average value $\Delta$Asr or the like, and the air pressure difference Ar between the left rear wheel and the right rear wheel is calculated.

Meanwhile, the predetermined air pressure difference map is, for example, a map showing a predetermined correspondence relationship between the difference between the wheel speed yaw rates Yf and Yr of each of the front and rear wheels and the vehicle yaw rate (detection value) Ys, and the air pressure differences Af and Ar of each of the front and rear wheels.

The turning correction coefficient calculation unit 35 calculates a turning correction coefficient Kp with reference to a predetermined map or the like stored in advance, based on a rudder angle detection value Ra which is output from the rudder angle sensor 23.

Figure 2:
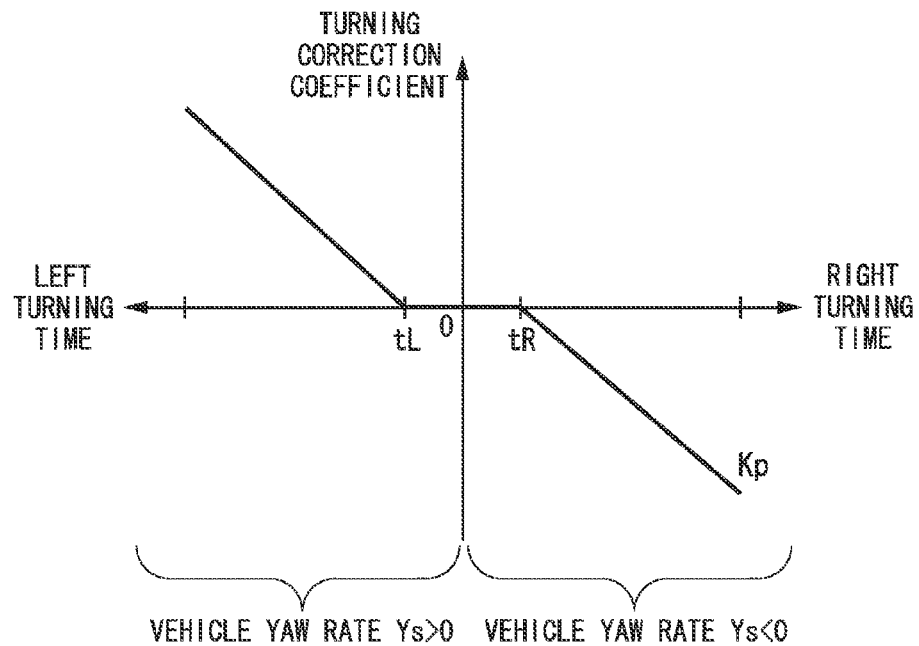
FIG. 2 is a diagram illustrating an example of a correspondence relationship between a turning correction coefficient and a turning polarity time (a left turning time or a right turning time) in the embodiment.

Meanwhile, the turning correction coefficient Kp is a coefficient calculated based on the amount of turning of the vehicle associated with a turning operation performed by a driver within a predetermined time which is equivalent to the time corresponding to a deviation due to a temperature change or the like of the vehicle yaw rate sensor 21 of the vehicle yaw rate (detection value) Ys. For example, as shown in FIG. 2, the predetermined map is a map showing a predetermined correspondence relationship between the turning polarity time (that is, left turning time or right turning time) corresponding to the amount of turning of the vehicle and the turning correction coefficient Kp. When the vehicle yaw rate Ys at the time of left turning is set to a positive value and the vehicle yaw rate Ys at the time of right turning is set to a negative value, and the left turning time and the right turning time are less than predetermined times tL and tR, the turning correction coefficient Kp is set to be 0. In addition, as the left turning time increases in excess of the predetermined time tL (for example, 10 s or the like), the turning correction coefficient Kp is set so as to increasingly change from 0 to the positive direction and, as the right turning time increases in excess of the predetermined time tR (for example, 10 s or the like), the turning correction coefficient Kp is set so as to decreasingly change from 0 to the negative direction.

The front wheel speed yaw rate correction unit 36 corrects the front wheel speed yaw rate Yf which is output from the front wheel speed yaw rate calculation unit 31, based on the turning correction coefficient Kp calculated by the turning correction coefficient calculation unit 35. More specifically, the front wheel speed yaw rate correction unit 36 corrects the temporal average value (time average value $\Delta$Asf) of the deviation between the front wheel speed yaw rate Yf, which is calculated by the air pressure difference (for the front wheels) calculation unit 33, and the vehicle yaw rate (detection value) Ys by using the turning correction coefficient Kp. And then, the front wheel speed yaw rate correction unit 36 corrects the front wheel speed yaw rate Yf by using a correction value (time average correction value $\Delta$Asfd) obtained by the correction, and outputs the corrected front wheel speed yaw rate Yfd.

The rear wheel speed yaw rate correction unit 37 corrects the rear wheel speed yaw rate Yr which is output from the rear wheel speed yaw rate calculation unit 32, based on the turning correction coefficient Kp calculated by the turning correction coefficient calculation unit 35. More specifically, the rear wheel speed yaw rate correction unit 37 corrects the temporal average value (time average value $\Delta$Asr) of the deviation between the rear wheel speed yaw rate Yr, which is calculated by the air pressure difference (for the rear wheels) calculation unit 34, and the vehicle yaw rate (detection value) Ys by using the turning correction coefficient Kp. And then, the rear wheel speed yaw rate correction unit 37 corrects the rear wheel speed yaw rate Yr by using a correction value (time average correction value $\Delta$Asrd) obtained by the correction, and outputs the corrected rear wheel speed yaw rate Yrd.

The vehicle yaw rate sensor correction unit 38 corrects the vehicle yaw rate (detection value) Ys which is output from the vehicle yaw rate sensor 21, based on at least the time average correction value $\Delta$Asfd calculated by the front wheel speed yaw rate correction unit 36 or the time average correction value $\Delta$Asrd calculated by the rear wheel speed yaw rate correction unit 37. For example, the vehicle yaw rate sensor correction unit 38 corrects the vehicle yaw rate (detection value) Ys using an average value $\Delta$As of the time average correction value $\Delta$Asfd and the time average correction value $\Delta$Asrd.

The air pressure drop determination unit 39 determines, for example, whether the difference between the time average correction value $\Delta$Asfd and the time average correction value $\Delta$Asrd is equal to or more than a predetermined threshold, based on the time average correction value $\Delta$Asfd calculated by the front wheel speed yaw rate correction unit 36 and the time average correction value $\Delta$Asrd calculated by the rear wheel speed yaw rate correction unit 37. When this difference is equal to or more than a predetermined threshold, it is determined that the diameter ratio of the right and left front wheels to the right and left rear wheels, that is, the air pressure difference between the right and left front wheels and the right and left rear wheels is abnormal (for example, a case, or the like where either of them is in a pressure drop state). A warning is reported to a driver of the vehicle from the alarming device 13, based on such a determination.

Figure 3:
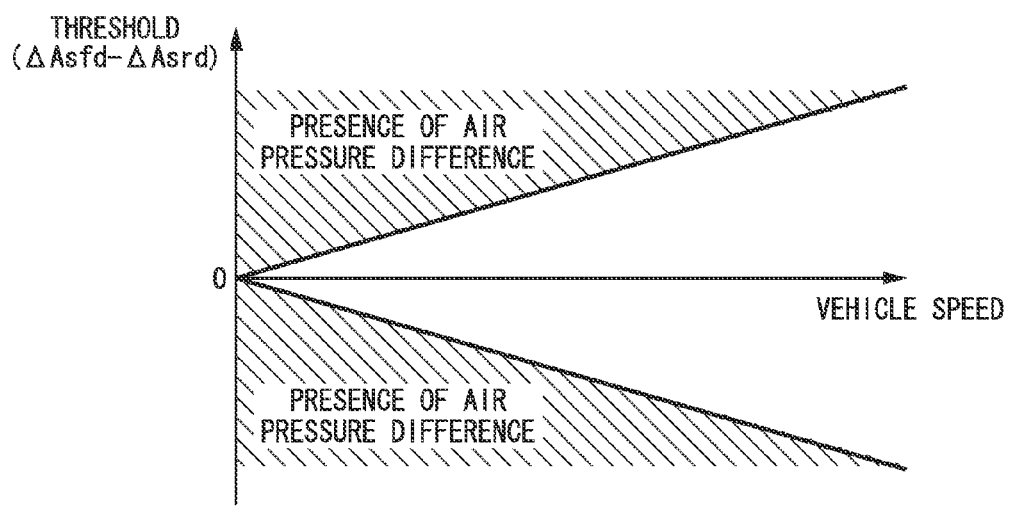
FIG. 3 is a diagram illustrating an example of a correspondence relationship between a predetermined threshold for the difference between a time average correction value $\Delta$Asfd and a time average correction value $\Delta$Asrd, and a vehicle speed in the embodiment.

Meanwhile, the predetermined threshold for the difference between the time average correction value $\Delta$Asfd and the time average correction value $\Delta$Asrd changes in accordance with the vehicle speed, for example, as shown in FIG. 3. Specifically, as the vehicle speed increases, the absolute value of the threshold is set so as to increasingly change.

Meanwhile, the alarming device 13 includes, for example, a tactile transmission device, a visual transmission device, and an auditory transmission device.

The tactile transmission device is, for example, a seat belt device, a steering control device, or the like. Specifically, for example, predetermined tension is generated to the seat belt in accordance with a control signal which is output from the air pressure drop determination unit 39, and thus a tightening force which is tactually perceivable by a passenger of the vehicle is caused to work, or, for example, a vibration (steering vibration) which is tactually perceivable by a driver of the vehicle is generated in the steering wheels.

The visual transmission device is, for example, a display device or the like, and displays predetermined information, for example, on the display device in accordance with a control signal which is input from the air pressure drop determination unit 39, or flashes a predetermined light body.

The auditory transmission device is, for example, a speaker or the like, and outputs a predetermined sound, voice or the like in accordance with a control signal which is input from the air pressure drop determination unit 39.

The yaw rate detection apparatus 10 according to the embodiment includes the above-mentioned configuration. Next, the operations of the yaw rate detection apparatus 10 will be described.

Figure 4:
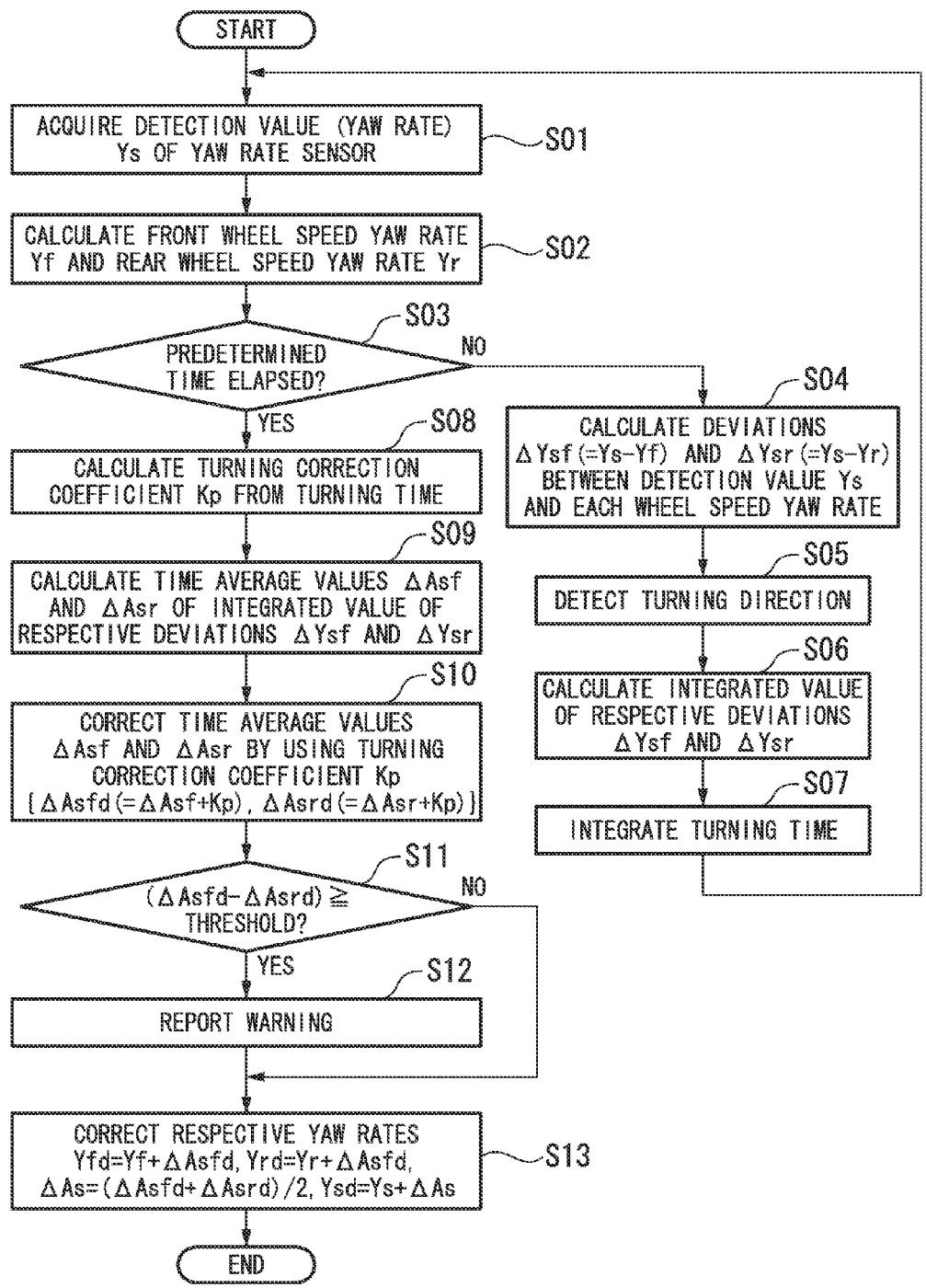
FIG. 4 is a flow diagram illustrating the operations of the yaw rate detection apparatus in the embodiment.

First, for example, in step S01 shown in FIG. 4, the vehicle yaw rate (detection value) Ys which is output from the vehicle yaw rate sensor 21 is acquired.

Next, in step S02, the front wheel speed yaw rate Yf is calculated based on the detection value Sfl of the left front wheel speed and the detection value Sfr of the right front wheel speed which are output from each of the wheel speed sensors 22FL and 22FR of front wheels, and the rear wheel speed yaw rate Yr is calculated based on the detection value Srl of the left rear wheel speed and the detection value Srr of the right rear wheel speed which are output from each of the wheel speed sensors 22RL and 22RR of rear wheels.

Next, in step S03, it is determined whether a predetermined time (for example, time equivalent to a deviation due to a temperature change of the vehicle yaw rate (detection value) Ys, a period in which the vehicle yaw rate (detection value) Ys is corrected, 50 s or the like) has elapsed.

When the determination result is "NO", the flow proceeds to step S04.

On the other hand, when the determination result is "YES", the flow proceeds to step S08 described later.

In step S04, the deviations of ΔYsf=(Ys−Yf) and ΔYsr=(Ys−Yr) between the vehicle yaw rate (detection value) Ys and each of the wheel speed yaw rates Yf and Yr are calculated.

In step S05, the turning direction of the vehicle is detected, for example, based on the vehicle yaw rate (detection value) Ys, each of the wheel speed yaw rates Yf and Yr, or the like.

In step S06, the integrated value of the respective deviations AYsf and AYsr is calculated.

In step S07, the turning time of the vehicle is integrated, and the flow returns to step S01 mentioned above. Meanwhile, the integration of the turning time of the vehicle is performed by sign inversion of left turning and right turning. For this reason, the integrated value (turning polarity time) obtained by the integration of the turning time is equal to a value corresponding to a bias of the turning direction.

In addition, in step S08, the turning correction coefficient Kp is calculated with reference to the map, for example, as shown in FIG. 2, in accordance with the integrated value of the turning time (turning polarity time, that is, left turning time tL or right turning time tR).

Next, in step S09, the average values (time average values ΔAsf and ΔAsr) of the integrated value of the respective deviations ΔYsf and ΔYsr are calculated.

Next, in step S10, each of the time average values ΔAsf and ΔAsr is corrected using the turning correction coefficient Kp, and respective time average correction values ΔAsfd(=ΔAsf+Kp) and ΔAsrd(=ΔAsr+Kp) are calculated.

Next, in step S11, it is determined whether the difference (ΔAsfd−ΔAsrd) between the time average correction value ΔAsfd and the time average correction value ΔAsrd is equal to or more than a predetermined threshold.

When the determination result is "NO", the flow proceeds to step S13 described later.

On the other hand, when the determination result is "YES", the flow proceeds to step S12.

Next, in step S12, it is determined that the air pressures between the front and rear wheels are abnormal (for example, drop state or the like), and a warning is reported to a driver of the vehicle.

Next, in step S13, the front wheel speed yaw rate Yf and the rear wheel speed yaw rate Yr are corrected by using each of the time average correction values ΔAsfd and ΔAsrd, and the corrected front wheel speed yaw rate Yfd(=Yf+ΔAsfd) and the corrected rear wheel speed yaw rate Yrd(=Yr+ΔAsrd) are outputted. Further, the vehicle yaw rate (detection value) Ys is corrected by using the average value ΔAs(=(ΔAsfd+ΔAsrd)/2) of the time average correction value ΔAsfd and the time average correction value ΔAsrd, a corrected vehicle yaw rate (detection value) Ysd(=Ys+ΔAs) is outputted, and the flow proceeds to end.

As mentioned above, according to the yaw rate detection apparatus 10 of the embodiment of the invention, the vehicle yaw rate (detection value) Ys can even be corrected during the turning traveling of the vehicle without being limited to the straight traveling thereof, based on the vehicle yaw rate (detection value) Ys which is output from the vehicle yaw rate sensor 21, each of the wheel speed yaw rates Yf and Yr, and the turning correction coefficient Kp.

In addition, as the amount of turning (that is, left turning time or right turning time) of the vehicle increases, the turning correction coefficient Kp increasingly changes, thereby the correction accuracy of the vehicle yaw rate (detection value) Ys can be improved.

Further, the detection values of the speeds of the right and left front wheels and the right and left rear wheels which are used for calculating each of the wheel speed yaw rates Yf and Yr are also associated with the diameter ratio between the right and left wheels, that is, the air pressure difference between the right and left wheels, in addition to the vehicle yaw rate. That is, the air pressure difference between the right and left front wheels and the right and left rear wheels can be determined from the diameter ratio of the right and left front wheels to the right and left rear wheels.

Specifically, the air pressure difference between the right and left front wheels and the right and left rear wheels is calculated by using the temporal average values (time average values ΔAsf and ΔAsr) of the deviation between each of the wheel speed yaw rates Yf and Yr and the vehicle yaw rate (detection value) Ys for each front wheel and rear wheel, and this air pressure difference is used for correcting the vehicle yaw rate (detection value) Ys, thereby the correction accuracy of the vehicle yaw rate (detection value) Ys can be improved. Moreover, for example, since the air pressure difference between the right and left front wheels and the right and left rear wheels is calculated without providing an air pressure sensor for each wheel, it is possible to reduce the costs required for configuration of the apparatus.

In addition, when the difference between the time average correction value ΔAsfd and the time average correction value ΔAsrd which corresponds to the difference between the front wheel speed yaw rate Yf and the rear wheel speed yaw rate Yr is equal to or more than a predetermined threshold, it can be determined that the air pressure difference between the front and rear wheels is abnormal due to a drop in the air pressure of any of the wheels. Therefore, when the difference between the time average correction value ΔAsfd and the time average correction value ΔAsrd is equal to or more than a predetermined threshold, it is possible to properly inform a driver of an abnormality of the air pressure difference between the front and rear wheels by reporting a warning to the driver.

Meanwhile, in the above-mentioned embodiment, in the vehicle yaw rate sensor correction unit 38, the vehicle yaw rate (detection value) Ys is corrected by using the average value ΔAs(=(ΔAsfd+ΔAsrd)/2) of the time average correction value ΔAsfd and the time average correction value ΔAsrd, but the operation of the vehicle yaw rate sensor correction unit 38 is not limited thereto. For example, in the vehicle yaw rate sensor correction unit 38, the vehicle yaw rate (detection value) Ys may be corrected by using either of the time average correction value ΔAsfd or the time average correction value ΔAsrd only.

Meanwhile, in the above-mentioned embodiment, the air pressure difference (for the front wheels) calculation unit 33 and the air pressure difference (for the rear wheels) calculation unit 34 calculate the air pressure differences (front wheels and rear wheel), respectively, using the temporal average values (time average values ΔAsf and ΔAsr) of the difference between each of the wheel speed yaw rates Yf and Yr and the vehicle yaw rate (detection value) Ys, but without being limited thereto, for example, may calculate air pressure differences (right and left front wheels and right and left rear wheels), respectively, based on other values that associates with the difference between each of the wheel speed yaw rates Yf and Yr and the vehicle yaw rate (detection value) Ys.

REFERENCE SINGS LIST

10: Yaw rate detection apparatus
11: Car body sensor unit
12: Control unit
13: Alarming device (Alarming device)
21: Vehicle yaw rate sensor (Vehicle yaw rate detection device)

22FL, 22FR, 22RL, 22RR: Wheel speed sensor (Right-wheel and left-wheel speed detection device)
23: Rudder angle sensor
31: Front wheel speed yaw rate calculation unit (Wheel speed yaw rate calculation device)
32: Rear wheel speed yaw rate calculation unit (Wheel speed yaw rate calculation device)
35: Turning correction coefficient calculation unit (Turning correction coefficient calculation device)
38: Vehicle yaw rate sensor correction unit (Vehicle yaw rate correction device)
39: Air pressure drop determination unit (Alarming device)
Sfl, Sfr, Srl, Srr: Right-wheel and left-wheel speed detection value
Af: Air pressure difference between left front wheel and right front wheel
Ar: Air pressure difference between left rear wheel and right rear wheel
Ra: Rudder angle detection value

The invention claimed is:

1. A yaw rate detection apparatus comprising:
a vehicle yaw rate detection device which detects a yaw rate of a vehicle to output a detection value thereof;
a right-wheel and left-wheel speed detection device which detects at least speeds of right and left wheels to output detection values thereof;
a wheel speed yaw rate calculation device which calculates a wheel speed yaw rate from the detection values of the speeds of the right and left wheels;
a turning correction coefficient calculation device which calculates a turning correction coefficient based on an amount of turning associated with a turning operation within a predetermined time in which the detection value of the vehicle yaw rate deviates due to a temperature change; and
a vehicle yaw rate correction device which corrects the detection value of the vehicle yaw rate based on the detection value of the vehicle yaw rate, the wheel speed yaw rate and the turning correction coefficient.

2. The yaw rate detection apparatus according to claim 1, wherein the turning correction coefficient calculation device calculates the turning correction coefficient so that an absolute value of the turning correction coefficient increases as the amount of turning increases.

3. The yaw rate detection apparatus according to claim 2, wherein the amount of turning associated with the turning operation is calculated by integration over a turning time of the vehicle, and
the integration is calculated by sign inversion of a left turning and a right turning.

4. The yaw rate detection apparatus according to claim 1, wherein the wheel speed yaw rate detection device calculates the wheel speed yaw rate with respect to a front wheel and a rear wheel, and
the yaw rate detection apparatus further comprises an alarming device which issues an alarm to a driver when a difference between the wheel speed yaw rate of the front wheel and the wheel speed yaw rate of the rear wheel is equal to or more than a predetermined value.

5. The yaw rate detection apparatus according to claim 4, wherein an absolute value of the predetermined value increasingly changes as a vehicle speed increases.

6. The yaw rate detection apparatus according to claim 4, wherein the amount of turning associated with the turning operation is calculated by integration over a turning time of the vehicle, and
the integration is calculated by sign inversion of a left turning and a right turning.

7. The yaw rate detection apparatus according to claim 1, wherein the amount of turning associated with the turning operation is calculated by integration over a turning time of the vehicle, and
the integration is calculated by sign inversion of a left turning and a right turning.

8. A yaw rate detection apparatus, comprising:
a vehicle yaw rate detection device which detects a yaw rate of a vehicle to output a detection value thereof;
a right-wheel and left-wheel speed detection device which detects at least speeds of right and left wheels to output detection values thereof;
a wheel speed yaw rate calculation device which calculates a wheel speed yaw rate from the detection values of the speeds of the right and left wheels;
a turning correction coefficient calculation device which calculates a turning correction coefficient based on an amount of turning associated with a turning operation within a predetermined time in which the detection value of the vehicle yaw rate deviates due to a temperature change; and
a vehicle yaw rate correction device which corrects the detection value of the vehicle yaw rate based on the detection value of the vehicle yaw rate, the wheel speed yaw rate and the turning correction coefficient, wherein the vehicle yaw rate correction device comprises:
a device which calculates a time average value which is an average value of an integrated value of a deviation between the detection value of the vehicle yaw rate and the wheel speed yaw rate,
a device which corrects the time average value by using the turning correction coefficient to calculate a time average correction value, and
a device which corrects the detection value of the vehicle yaw rate by using the time average correction value.

9. The yaw rate detection apparatus according to claim 8, wherein the device which corrects the detection value of the vehicle yaw rate by using the time average correction value corrects the vehicle yaw rate by using an average value of a time average correction value of the front wheel and a time average correction value of the rear wheel.

10. The yaw rate detection apparatus according to claim 9, wherein the amount of turning associated with the turning operation is calculated by integration over a turning time of the vehicle, and
the integration is calculated by sign inversion of a left turning and a right turning.

11. The yaw rate detection apparatus according to claim 8, wherein the amount of turning associated with the turning operation is calculated by integration over a turning time of the vehicle, and
the integration is calculated by sign inversion of a left turning and a right turning.

* * * * *